United States Patent
Odaka et al.

(10) Patent No.: US 8,896,154 B2
(45) Date of Patent: Nov. 25, 2014

(54) POWER CONVERSION DEVICE (75) Inventors: Akihiro Odaka, Hino (JP); Akio Toba, Hino (JP); Masakazu Gekinozu, Matsumoto (JP); Kouetsu Fujita, Suzuka (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/515,807

(22) PCT Filed: Sep. 1, 2011

(86) PCT No.: PCT/JP2011/069873
§ 371 (c)(1),
(2), (4) Date: Aug. 22, 2012

(87) PCT Pub. No.: WO2012/046526
PCT Pub. Date: Apr. 12, 2012

(65) Prior Publication Data
US 2013/0207637 A1    Aug. 15, 2013

(30) Foreign Application Priority Data

Oct. 7, 2010 (JP) ................ 2010-227232

(51) Int. Cl.
*H02J 9/06* (2006.01)
*H02M 3/155* (2006.01)
*H02M 1/32* (2007.01)

(52) U.S. Cl.
CPC ............... *H02M 3/155* (2013.01); *H02M 1/32* (2013.01)
USPC .............................................. 307/66; 363/65

(58) Field of Classification Search
USPC ............... 363/16–20, 34–41, 97, 98, 132, 65; 323/222, 224, 225, 237, 282–299; 307/64–66
See application file for complete search history.

(56) References Cited

U.S. PATENT DOCUMENTS

| 4,017,784 | A | * | 4/1977 | Simmons et al. ............... 363/17 |
| 4,782,241 | A | * | 11/1988 | Baker et al. ...................... 307/66 |
| 5,229,650 | A | * | 7/1993 | Kita et al. ........................ 307/66 |
| 6,104,104 | A | * | 8/2000 | Kuroki ............................. 307/66 |

(Continued)

FOREIGN PATENT DOCUMENTS

| JP | 2007-014193 A | 1/2007 |
| JP | 2007-213842 A | 8/2007 |

(Continued)

OTHER PUBLICATIONS

E. K. Sato, "Double DC-DC converter for uninterruptible power supply applications," 2010 International Power Electronics Conference (IPEC), Jun. 21-24, 2010, pp. 635-642.

*Primary Examiner* — Rajnikant Patel
(74) *Attorney, Agent, or Firm* — Rabin & Berdo, P.C.

(57) ABSTRACT

With a power conversion device, it is possible to lengthen the lifespan of a mechanical switch by preventing an absorption by the mechanical switch of induction energy accumulated in a reactor when there is a problem. When a mechanical switch is turned off when there is a problem, an absorption by the mechanical switch of induction energy accumulated in a reactor is prevented by the energy accumulated in the reactor being released to a capacitor via a diode, thus enabling a lengthening of the lifespan of the mechanical switch.

20 Claims, 4 Drawing Sheets

(56) References Cited

U.S. PATENT DOCUMENTS

| | | |
|---|---|---|
| 7,737,580 B2 * | 6/2010 | Hjort et al. .................. 307/65 |
| 8,053,927 B2 * | 11/2011 | Hjort et al. .................. 307/64 |
| 2006/0033480 A1 | 2/2006 | Soldano |
| 2010/0187908 A1 | 7/2010 | Okano et al. |

FOREIGN PATENT DOCUMENTS

| | | |
|---|---|---|
| JP | 2007-252164 A | 9/2007 |
| JP | 2007-259564 A | 10/2007 |
| JP | 2008-099518 A | 4/2008 |
| JP | 2009-005488 A | 1/2009 |

* cited by examiner

POWER CONVERSION DEVICE

CROSS-REFERENCE TO RELATED APPLICATION

This application is the national phase of international application number PCT/JP2011/069873, filed Sep. 1, 2011, and claims the benefit of priority of Japanese patent application JP PA 2010-227232, filed Oct. 7, 2010. The disclosures of the international application and the Japanese priority application are incorporated herein by reference.

BACKGROUND

1. Technical Field

The present invention relates to a power conversion device, such as a DC-DC converter, with which it is possible to lengthen the lifespan of a mechanical switch, and reduce loss occurring in a reactor when there is a light load.

2. Background Art

Figure 7:
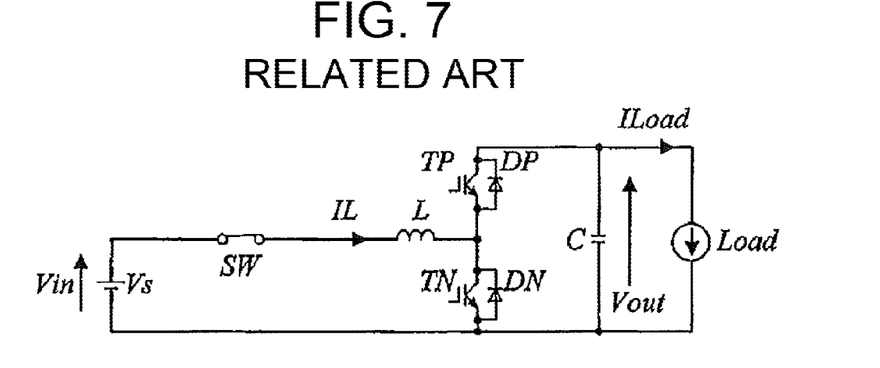
FIG. 7 is a main portion configuration diagram of a heretofore known step-up DC-DC converter.

FIG. 7 is a main portion configuration diagram of a heretofore known step-up DC-DC converter. This is shown in, for example, E. K. Sato et al., "Double DC-DC Converter for Uninterruptible Power Supply Applications," the 2010 International Power Electronics Conference pp. 635-642, 2010.

FIG. 7 is a DC-DC converter that, converting a voltage (=an input voltage Vin) of a direct current power source Vs to a voltage (=an output voltage Vout) higher than the voltage of the Vs by alternately turning on and off a TP and a TN, which are switching elements (in the drawing, insulated gate bipolar transistors: IGBTs), at an appropriate time ratio, supplies power to a load.

Also, in FIG. 7, the load is a current source Load assumed to be an automobile motor, or the like, but even when the direction of a current ILoad of the current source Load is a direction opposite to that shown in the drawing, the TP and TN are turned on and off at an appropriate time ratio so that the voltage (=the output voltage Vout) applied to the load (=the current source Load) is a desired voltage. In this case, a current IL of a reactor L flows in a direction opposite to the direction shown in the drawing, and power is regenerated from the load (=the current source Load: a motor or the like) to the direct current power source Vs. In this way, in the case of the circuit configuration of FIG. 7, a bidirectional power flow (bidirectional flow), from the direct current power source Vs to the current source Load or from the current source Load to the direct current power source Vs, is possible. SW in the drawing, being a mechanical switch, breaks (turns off) the circuit when there is a problem with the DC-DC converter. The mechanical switch is widely used, as it is resistant to noise and is low cost. Also, the mechanical switch being a contact switch, it may be a knife switch, a breaker, a relay switch with contact, or the like, with the insertion into and removal from a socket of a plug also included. Although the mechanical switch is not directly shown in the E. K. Sato et al. article, it is indispensible for an actual device.

Figure 8:
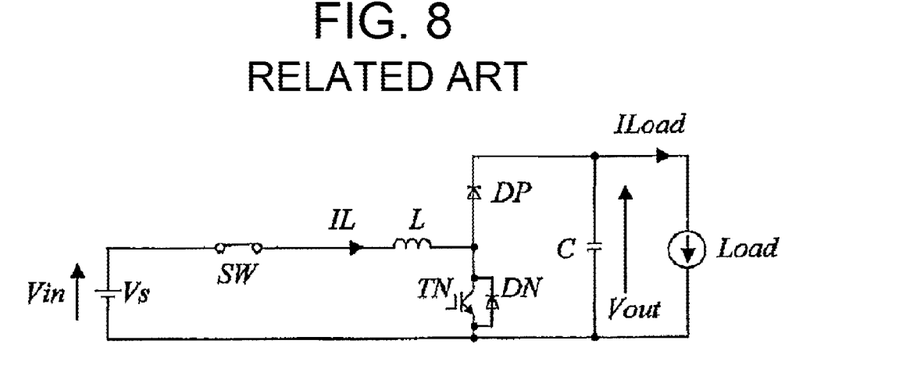
FIG. 8 is a configuration diagram of another heretofore known step-up DC-DC converter.

FIG. 8 is a configuration diagram of another heretofore known step-up DC-DC converter. While a bidirectional power flow is possible in FIG. 7, there are cases in which, depending on the load, it is sufficient that the power flow is in one direction, that is, it is sufficient to supply power to the load (a unidirectional flow). In this case, it is possible to omit the TP of FIG. 7. Also, with the current IL flowing through the reactor L flowing in the direction of the arrow in FIG. 8, the power flow and current directions are unidirectional.

Figure 9:
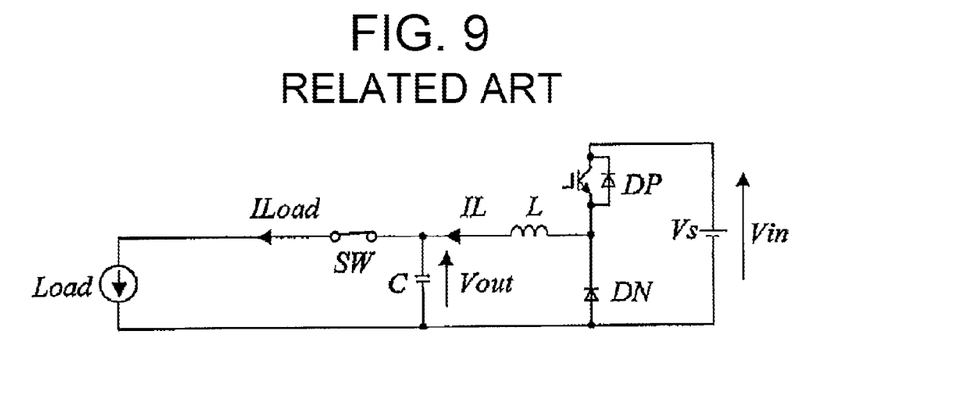
FIG. 9 is a configuration diagram of a heretofore known step-down DC-DC converter.

FIG. 9 is a configuration diagram of a heretofore known step-down DC-DC converter. While FIG. 8 is a step-up DC-DC converter that supplies power to the load by boosting the voltage of the direct current power source Vs, the circuit configuration of FIG. 9 is a step-down DC-DC converter that supplies power to the load by reducing the voltage of the direct current power source Vs. In this case, it is possible to omit the TN of FIG. 7. Also, with the current IL flowing through the reactor L flowing in the direction of the arrow in the drawing, the power flow and current directions are unidirectional (a unidirectional flow).

Also, in JP-A-2007-213842, it is described how an arc is prevented by providing an electronic switch in series with a mechanical switch, and arranging that no high voltage is applied to the mechanical switch by first turning off the electronic switch, then turning off the mechanical switch.

Also, in JP-A-2007-252164, it is described how a resonance circuit is connected in parallel with a mechanical switch, the sum of the normal current of a direct current power source system and a resonance current is caused to flow through the mechanical switch, and the mechanical switch is turned off when the sum is zero.

In the circuits shown in FIG. 7, FIG. 8, and FIG. 9, the mechanical switch SW is for electrically disconnecting the direct current power source Vs or the load (the current source Load) and the power conversion device, and acts (goes off) when a problem occurs with the power conversion device, or when a problem occurs with the load.

Herein, as it is necessary for the mechanical switch SW to consume induction energy accumulated in the reactor L, the allowed value of inductance connected to the mechanical switch SW is, in general, prescribed. Normally, however, even when a reactor L with prescribed inductance is connected, an arc is generated when the mechanical switch SW is turned off (opened), abrading the mechanical switch SW, and shortening the lifespan thereof. Also, when an inductance higher than that prescribed is connected, a problem occurs in that the lifespan of the mechanical switch SW becomes markedly shorter, and the like.

In particular, in FIG. 7 and FIG. 8, all the energy accumulated in the reactor L is consumed by an arc generated when the mechanical switch is turned off. When an arc is generated when the mechanical switch SW is turned off in this way, the contact of the mechanical switch is damaged, and the lifespan thereof is shortened. Also, in FIG. 9, as the energy accumulated in the reactor L is absorbed by the capacitor C when the mechanical switch SW is turned off, it is possible to suppress the shortening of the lifespan of the mechanical switch SW. However, when the capacitance of the capacitor C is small, the voltage of the capacitor C rises markedly due to absorbing the energy accumulated in the reactor L, meaning that it is necessary to arrange that the voltage of the capacitor is equal to or lower than the withstand voltage of the capacitor by using a capacitor with a large withstand voltage, or by using a capacitor with a large capacitance, meaning that the capacitor leads to an increase in size of the device.

Also, although it is assumed that various kinds of load are connected as the load of the power conversion device, in general, the higher the output voltage Vout, the higher the output power of the power conversion device, and conversely, the lower the output voltage Vout, the lower the output power as a power conversion device.

Herein, with a step-up DC-DC converter, it is assumed that driving will be carried out in a condition wherein the output voltage Vout is equal to the input voltage Vin when the load is light (when the device output power is low). Strictly speaking, however, owing to the effect of a semiconductor element (for example, the diode DP) voltage drop, or the like, the output voltage Vout is not necessarily equal to the input voltage Vin.

In this case, in principle, the reactor L is unnecessary. However, there is a problem in that, the reactor L being installed in the circuit, loss occurs due to current flowing through the reactor L.

Also, in JP-A-2007-213842 and JP-A-2007-252164, the circuit added to the mechanical switch SW, and the circuit controlling that circuit, are large-scale, causing a rise in cost. Also, when the output voltage and input voltage are equal when there is a light load, it is not possible to combat a problem of loss of the current IL flowing through the reactor L.

SUMMARY

An object of the invention is to provide a power conversion device with which it is possible to solve the heretofore described problems by eliminating the absorption by a mechanical switch of inductive energy accumulated in a reactor when there is a problem, without causing an increase in size of a device, thus lengthening the lifespan of the mechanical switch.

Also, an object of the invention is to provide a power conversion device with which it is possible to reduce loss in a reactor when there is a light load.

Figure 1:
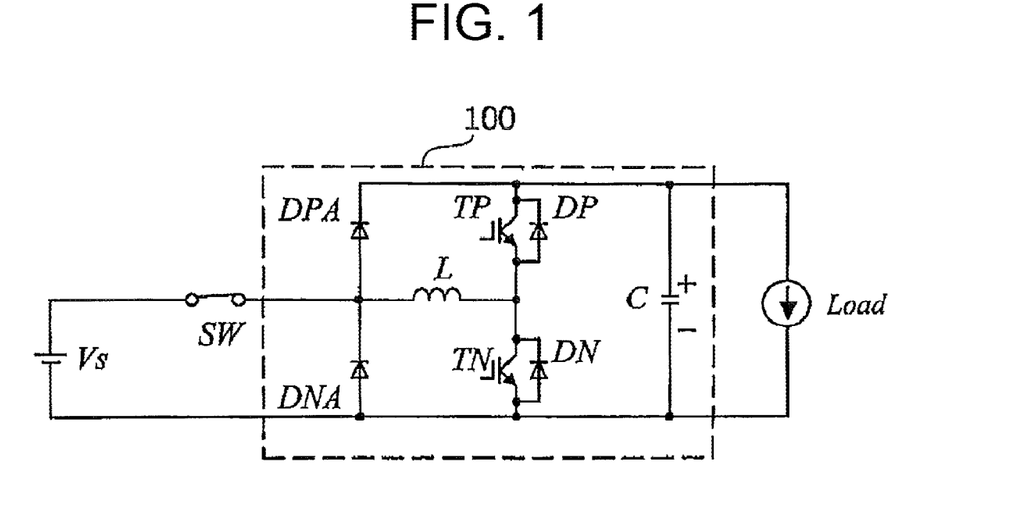
FIG. 1 is a main portion configuration diagram of a power conversion device of a first working example of the invention.

In order to achieve the heretofore described objects, according to a first aspect of the invention, a power conversion device (for example, a step-up DC-DC converter 100 of FIG. 1), comprises a power semiconductor series circuit including a first power semiconductor switch (for example, TP and DP of FIG. 1) and second power semiconductor switch (for example, TN and DN of FIG. 1) connected in series (for example, by connecting the emitter of the TP and the collector of the TN of FIG. 1). The power conversion device further includes a capacitor (for example, C of FIG. 1) connected in parallel to the power semiconductor series circuit, and a reactor (for example, L of FIG. 1). One end of the reactor is connected to a series connection point (for example, a connection point of the emitter of the TP and the collector of the TN of FIG. 1) of the first power semiconductor switch and second power semiconductor switch.

The power conversion device further includes a first power diode (for example, DPA of FIG. 1), whose anode is connected to the other end of the reactor and whose cathode is connected to a high potential side end (for example, the collector side end of the TP of FIG. 1) of the power semiconductor series circuit, and a second power diode (for example, DNA of FIG. 1), whose cathode is connected to the other end of the reactor and whose anode is connected to a low potential side end (for example, the emitter side end of the TN of FIG. 1) of the power semiconductor series circuit. The other end of the reactor in, for example, FIG. 1, is connected to the positive electrode of a direct current power source Vs via a mechanical switch SW, and the capacitor is connected to a load Load of FIG. 1.

Figure 3:
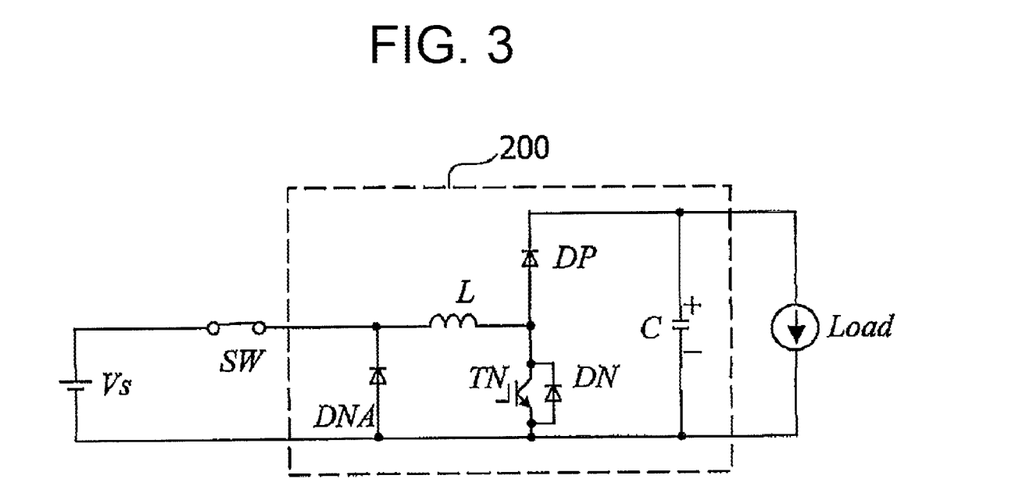
FIG. 3 is a main portion configuration diagram of a power conversion device of a second working example of the invention.

According to a second aspect of the invention, a power conversion device comprises a power semiconductor series circuit including a first power diode (for example, DP of FIG. 3) and a power semiconductor switch (for example, TN and DN of FIG. 3) connected in series (for example, by connecting the anode of the DP and the collector of the TN of FIG. 3). The power conversion device further includes a capacitor (for example, C of FIG. 3) connected in parallel to the power semiconductor series circuit, and a reactor (for example, L of FIG. 3. One end of the reactor is connected to a series connection point (for example, a connection point of the anode of the DP and the collector of the TN of FIG. 3) of the first power diode and power semiconductor switch.

The power conversion device further includes a second power diode (for example, DNA of FIG. 3), whose cathode is connected to the other end of the reactor and whose anode is connected to a low potential side end (for example, the emitter side end of the TN of FIG. 3) of the power semiconductor series circuit. The other end of the reactor is connected to the positive electrode of the direct current power source Vs via the mechanical switch SW of FIG. 3, and the capacitor in, for example, FIG. 3 is connected to the load Load.

Figure 5:
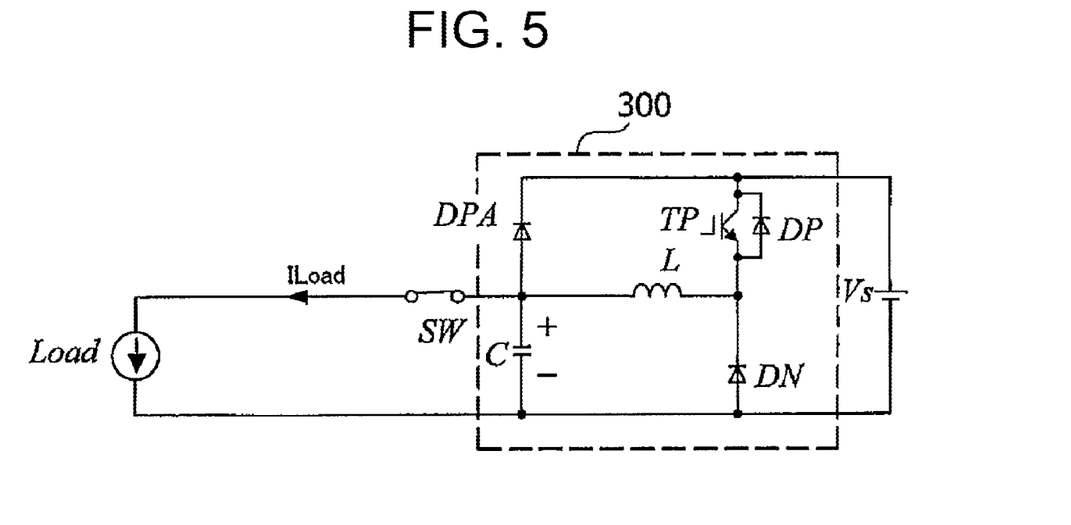
FIG. 5 is a main portion configuration diagram of a power conversion device of a third working example of the invention.

According to a third aspect of the invention, a power conversion device comprises a power semiconductor series circuit including a power semiconductor switch (for example, TP and DP of FIG. 5) and a first power diode (for example, DN of FIG. 5) connected in series (for example, by connecting the emitter of the TP and the anode of the DN of FIG. 5), and a reactor (for example, L of FIG. 5), of which one end is connected to a series connection point (for example, a connection point of the emitter of the TP and the anode of the DN of FIG. 5) of the power semiconductor switch and first power diode. The power conversion device further includes a capacitor (for example, C of FIG. 5) connected to the other end of the reactor and a low potential side end (for example, the anode side end of the DN of FIG. 5) of the power semiconductor series circuit.

The power conversion device further includes a second power diode (for example, DPA of FIG. 5), whose anode is connected to the other end of the reactor and whose cathode is connected to a high potential side end (for example, the collector side end of the TP of FIG. 5) of the power semiconductor series circuit. The high potential side end of the power semiconductor series circuit in, for example, FIG. 5, is connected to the positive electrode of the direct current power source Vs, and the other end of the reactor is connected to the load via the mechanical switch SW.

According to a fourth aspect of the invention, it is preferable that the power semiconductor switch according to the first through third aspects of the invention includes a switch configured by connecting a self-turn-off device and a diode in parallel.

According to a fifth aspect of the invention, it is preferable that the self-turn-off device according to the fourth aspect of the invention includes a MOS transistor (IGBT or MOSFET) or a bipolar transistor.

According to a sixth aspect of the invention, it is preferable that the power semiconductor switch according to the first through third aspects of the invention includes a MOS transistor incorporating a parasitic diode (for example, a power MOSFET incorporating a parasitic diode, or the like).

Advantage of the Invention

According to the invention, when the mechanical switch SW is turned off when there is a problem, an absorption by the SW of induction energy accumulated in the reactor is prevented by the energy accumulated in the reactor being released to the capacitor C via a diode. As a result of this, it is possible to lengthen the lifespan of the SW.

Also, when there is a light load, it is possible to considerably reduce loss occurring in reactor current by bypassing current passing through the reactor using a diode.

DETAILED DESCRIPTION

An embodiment will be described using the following working examples. The same reference numerals and signs are given to portions the same as those in a heretofore known structure.

Working Example 1

FIG. 1 is a main portion configuration diagram of a power conversion device of a first working example of the invention. The power conversion device is a step-up DC-DC converter 100, wherein the flow of power is a bidirectional flow from a direct current power source Vs to a current source Load, which is a load, and from the current source Load to the direct current power source Vs. Also, the direct current power source Vs, a mechanical switch SW, and the current source Load, which is the load, are also shown in FIG. 1.

The step-up DC-DC converter 100 is formed of a reactor L, of which one end is connected via the mechanical switch SW to a high potential side end (positive electrode) of the direct current power source Vs, a diode DPA, whose anode is connected to the one end of the reactor L, and a diode DNA, whose cathode is connected to the one end of the reactor L.

Also, the step-up DC-DC converter 100 is formed of an IGBT (TP), which is a switching element whose emitter is connected to the other end of the reactor L, an IGBT (TN), which is a switching element whose collector is connected to the other end of the reactor L, a diode DP, whose anode is connected to the emitter of the IGBT (TP), and a diode DN, whose cathode is connected to the collector of the IGBT (TN). A power semiconductor series circuit is formed by the TP, TN, DP, and DN, and the other end of the reactor L is connected to a series connection point to which the emitter of the TP and the collector of the TN are connected. Also, the TP collector side end will be called a high potential side end of the power semiconductor series circuit, and the TN emitter side end will be called a low potential side end of the power semiconductor series circuit.

Also, the cathode of the diode DPA, the collector of the IGBT (TP), and the cathode of the diode DP being connected to each other, the step-up DC-DC converter 100 is formed of a capacitor C of which one end (the side forming the positive electrode) is connected to the collector of the IGBT (TP).

Also, the low potential side end (negative electrode at ground potential) of the direct current power source Vs, the anode of the diode DNA, the emitter of the IGBT (TN), the anode of the diode DN, and the other end (the side forming the negative electrode) of the capacitor C are connected to each other.

Also, the current source Load, which is the load, is connected in parallel to the capacitor C. The current source Load is assumed to be a battery, a motor, or the like, the mechanical switch SW is assumed to be a knife switch, a contact relay, an insertion and removal of a plug, or the like, and the direct current power source Vs is assumed to be a direct current power source wherein a commercial alternating current power source is converted into a direct current, or a direct current power source such as an electrical cell.

A point differing from heretofore known technology shown in FIG. 7 is that the diodes DPA and DNA are provided, and that the one end of the reactor L is connected to both ends of the capacitor C via the diodes DPA and DNA.

Figure 2:
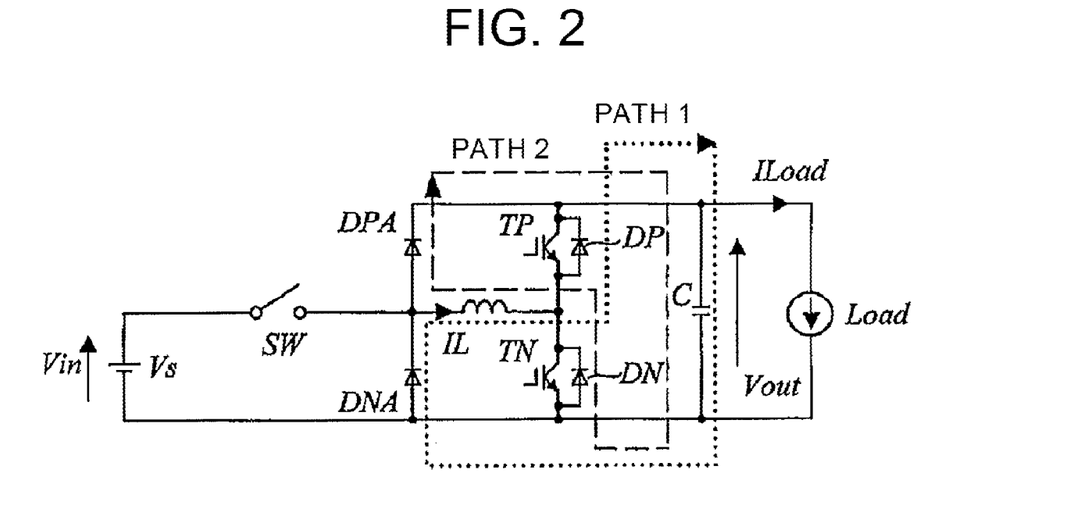
FIG. 2 is an explanatory drawing showing an operating condition of a step-up DC-DC converter 100 of FIG. 1.

FIG. 2 is an explanatory drawing showing an operating condition of the step-up DC-DC converter 100 of FIG. 1. For example, it is assumed that, in a condition in which power is being supplied to the load (=the current source Load), that is, when a current IL is caused to flow in the directions of the arrows shown in the drawing, the mechanical switch SW has gone off due to some problem. When the mechanical switch SW goes off (breaks a path), a current flows along path 1 of FIG. 2, and energy accumulated in the reactor L is released to the capacitor C.

Meanwhile, it is assumed that, in a condition in which energy is being regenerated from the load (=the current source Load) to the direct current power source Vs, that is, when the current IL is caused to flow in directions opposite to those of the arrows shown in FIG. 2, the mechanical switch SW has gone off due to some problem. When the mechanical switch SW goes off, a current flows along path 2 of FIG. 2, and energy accumulated in the reactor L is released to the capacitor C.

In this way, current flows along the path 1 or path 2 when the mechanical switch SW goes off, the energy accumulated in the reactor L is released to the capacitor C, and it no longer happens that inductive energy accumulated in the reactor L is absorbed by the mechanical switch SW.

In this way, as the inductive energy accumulated in the reactor L is no longer absorbed by the mechanical switch SW in any case, it is possible to lengthen the lifespan of the mechanical switch SW.

Also, when there is a light load, an alternate turning on and off of the power semiconductor elements TP and TN is stopped. This means that the TP and TN are both in an off condition, or that the TP is constantly in an on (the TN is constantly off) condition. By so doing, an output voltage Vout is essentially equal to an input voltage Vin (=the voltage of the direct current power source Vs).

When there is this kind of operating condition, current flowing out from the direct current power source Vs follows the following two paths. (1) From the direct current power source Vs through the diode DPA, the capacitor C and the current source Load, which is the load, to the direct current power source Vs, (2) from the direct current power source Vs through the reactor L, the diode DP, the capacitor C and the current source Load, which is the load, to the direct current power source Vs.

Of the two current paths, as the path in (1) has low impedance compared with the path of (2), most of the current flows along the path of (1). That is, the current flows without passing through the reactor L. Because of this, loss occurring in the reactor L is reduced. As a result of this, when there is a driving condition such as a light load, it is possible to reduce loss occurring in the reactor L by not sending an on signal to the IGBTs (TP and TN).

It is good that an unshown low capacity capacitor is connected in parallel to the diode DNA of FIG. 1. The current IL flowing through the reactor L owing to an operation of the power conversion device 100 includes a pulse component but, when the direct current power source Vs is a secondary cell such as a battery, the pulse component may have an adverse effect, such as promoting lifespan reduction of the secondary cell. Because of this, it is possible to suppress the pulse component flowing through the direct current power source Vs by connecting the unshown low capacity capacitor.

Working Example 2

FIG. 3 is a main portion configuration diagram of a power conversion device of a second working example of the invention. The power conversion device is a step-up DC-DC converter 200, wherein the flow of power is a unidirectional flow from the direct current power source Vs to the current source Load. Also, the direct current power source Vs, the mechanical switch SW, and the current source Load, which is the load, are also shown in FIG. 3.

The step-up DC-DC converter 200 is formed of the reactor L, of which one end is connected via the mechanical switch SW to the high potential side end (positive electrode) of the direct current power source Vs, and the diode DNA, whose cathode is connected to the one end of the reactor L.

Also, the step-up DC-DC converter 200 is formed of the IGBT (TN), whose collector is connected to the other end of the reactor L, the diode DP, whose anode is connected to the other end of the reactor L, the diode DN, whose cathode is connected to the collector of the IGBT (TN), and the capacitor C, of which one end (the side forming the positive electrode) is connected to the cathode of the diode DP.

Also, the low potential side end (negative electrode) of the direct current power source Vs, the anode of the diode DNA, the emitter of the IGBT (TN), the anode of the diode DN, and the other end (the side forming the negative electrode) of the capacitor C are connected to each other. The current source Load, which is the load, is connected in parallel to the capacitor C.

A point differing from a heretofore known circuit configuration shown in FIG. 8 is that the diode DNA is provided, and that the one end of the reactor L is connected to the negative electrode of the capacitor C via the diode DNA.

Figure 4:
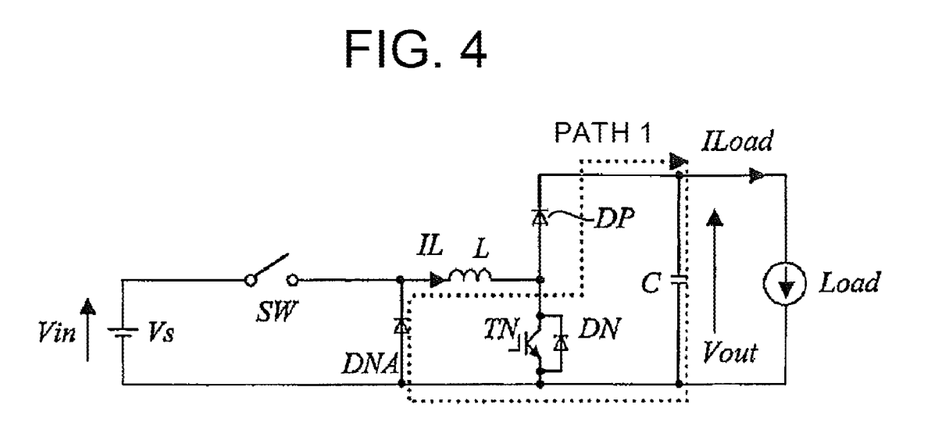
FIG. 4 is an explanatory drawing showing an operating condition of a step-up DC-DC converter 200 of FIG. 3.

FIG. 4 is an explanatory drawing showing an operating condition of the step-up DC-DC converter 200 of FIG. 3. It is assumed that the mechanical switch SW has gone off due to some problem while driving (when the current IL is caused to flow in the directions of the arrows). When the mechanical switch SW goes off, a current flows along path 1 of the drawing, and energy accumulated in the reactor L is released to the capacitor C.

In this way, current flows along the path 1 when the mechanical switch SW goes off, the energy accumulated in the reactor L is released to the capacitor C, and it no longer happens that energy is absorbed by the mechanical switch SW. As a result of this, it is possible to lengthen the lifespan of the mechanical switch SW.

It is good that an unshown low capacity capacitor is connected in parallel to the diode DNA of FIG. 2. The current IL flowing through the reactor L owing to an operation of the power conversion device 200 includes a pulse component but, when the direct current power source Vs is a secondary cell such as a battery, the pulse component may have an adverse effect, such as promoting lifespan reduction of the secondary cell. Because of this, it is possible to suppress the pulse component flowing through the direct current power source Vs by connecting the unshown low capacity capacitor.

Working Example 3

FIG. 5 is a main portion configuration diagram of a power conversion device of a third working example of the invention. The power conversion device is a step-down DC-DC converter 300, wherein the flow of power is a unidirectional flow from the direct current power source Vs to the current source Load. Also, the direct current power source Vs, the mechanical switch SW, and the current source Load, which is the load, are also shown in FIG. 5.

The step-down DC-DC converter 300 is formed of the IGBT (TP), whose collector is connected to the high potential side end (positive electrode) of the direct current power source Vs, the diode DP, whose cathode is connected to the collector of the IGBT (TP), and the reactor L, of which one end is connected to the emitter of the IGBT (TP) and the anode of the diode DP.

Also, the step-down DC-DC converter 300 is formed of the diode DN, whose cathode is connected to the emitter of the IGBT (TP), the diode DPA, whose cathode is connected to the collector of the IGBT (TP), and the capacitor C, of which one end (the positive electrode) is connected to the anode of the diode DPA and the other end of the reactor L.

Also, the low potential side end (negative electrode) of the direct current power source Vs, the anode of the diode DN, and the other end (the negative electrode) of the capacitor C are connected to each other. One end (the side forming the positive electrode) of the capacitor C is connected to the current source Load, which is the load, via the mechanical switch SW.

A point differing from a heretofore known circuit configuration shown in FIG. 9 is that the diode DPA is provided, and that the anode of the diode DPA is connected to the other end of the reactor L and the cathode of the diode DPA to the collector of the TP. In FIG. 5, an unshown switch is installed between the step-down DC-DC converter 300 and the direct current power source Vs.

Figure 6:
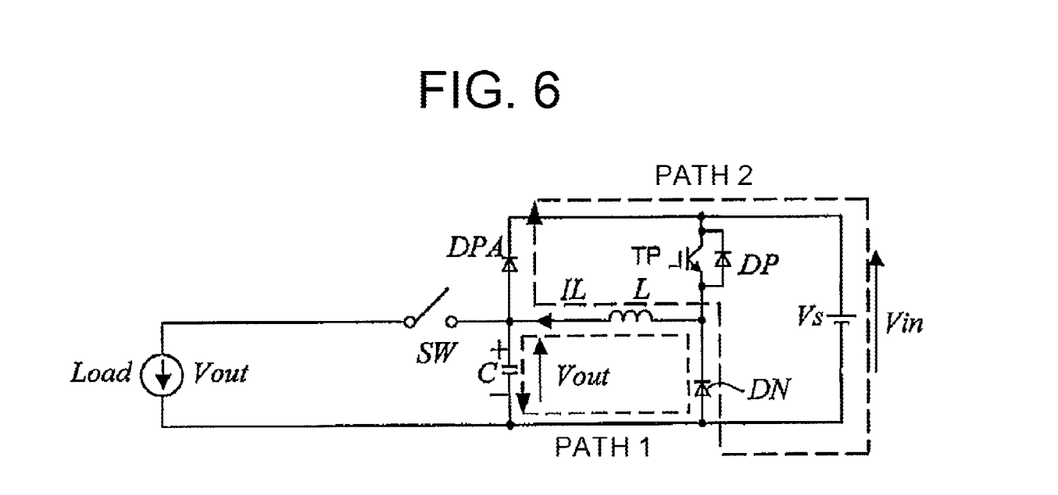
FIG. 6 is an explanatory drawing showing an operating condition of a step-down DC-DC converter 300 of FIG. 5.

FIG. 6 is an explanatory drawing showing an operating condition of the step-down DC-DC converter 300 of FIG. 5. It is assumed that the operating condition is that when charging the battery of an automobile with a commercial power source, or the like. It is assumed that the mechanical switch SW has gone off due to some problem during the operation (when the current IL is caused to flow in the directions of the arrows). When the mechanical switch SW goes off, current in path 1 of the drawing charges the capacitor C, and energy accumulated in the reactor L is absorbed. However, when the capacitor C is small, the voltage of the positive electrode of the capacitor C exceeds the voltage Vin of the direct current power source Vs due to the energy of the reactor L. Because of this, current in path 2 of the drawing flows to the direct current power source Vs through the diode DPA, and the voltage of the positive electrode of the capacitor C is clamped at the voltage of the direct current power source Vs.

That is, neither a capacitor with an unnecessarily large withstand voltage nor a capacitor with a large capacitance is any longer used, and it is possible to achieve a reduction in size of the device.

In Working Examples 1, 2, and 3, the IGBTs (TP and TN), which are self-turn-off devices, and the diodes (DP and DN) connected in reverse parallel thereto, are given as an example of the power semiconductor switch, but there are cases in which power MOSFETS or bipolar transistors are used instead of the IGBTs. Also, when using a power MOSFET including a parasitic diode, the diodes DP and DN connected in reverse parallel to the TP or TN become unnecessary for the power semiconductor switch.

The invention claimed is:

1. A power conversion device, comprising:
    a power semiconductor series circuit including a first power semiconductor switch and second power semiconductor switch connected in series;
    a capacitor connected in parallel to the power semiconductor series circuit;
    a reactor, of which one end is connected to a series connection point of the first power semiconductor switch and second power semiconductor switch;
    a first power diode, whose anode is connected to another end of the reactor and whose cathode is connected to a high potential side end of the power semiconductor series circuit; and
    a second power diode, whose cathode is connected to the other end of the reactor and whose anode is connected to a low potential side end of the power semiconductor series circuit.

2. A power conversion device, comprising:
    a power semiconductor series circuit including a first power diode and a power semiconductor switch connected in series;
    a capacitor connected in parallel to the power semiconductor series circuit;
    a reactor, of which one end is connected to a series connection point of the first power diode and power semiconductor switch; and
    a second power diode, whose cathode is connected to another end of the reactor and whose anode is connected to a low potential side end of the power semiconductor series circuit.

3. A power conversion device, comprising:
    a power semiconductor series circuit including a power semiconductor switch and a first power diode connected in series;
    a reactor, of which one end is connected to a series connection point of the power semiconductor switch and first power diode;
    a capacitor connected to another end of the reactor and a low potential side end of the power semiconductor series circuit; and
    a second power diode, whose anode is connected to the other end of the reactor and whose cathode is connected to a high potential side end of the power semiconductor series circuit.

4. The power conversion device according to claim 1 wherein the power semiconductor switch includes a self-turn-off device and a diode connected in parallel.

5. The power conversion device according to claim 4, wherein the self-turn-off device includes a MOS transistor or a bipolar transistor.

6. The power conversion device according to claim 1, wherein the power semiconductor switch includes a MOS transistor incorporating a parasitic diode.

7. The power conversion device according to claim 2, wherein the power semiconductor switch includes a self-turn-off device and a diode connected in parallel.

8. The power conversion device according to claim 3, wherein the power semiconductor switch includes a self-turn-off device and a diode connected in parallel.

9. The power conversion device according to claim 2, wherein the power semiconductor switch includes a MOS transistor incorporating a parasitic diode.

10. The power conversion device according to claim 3, wherein the power semiconductor switch includes a MOS transistor incorporating a parasitic diode.

11. An apparatus, comprising:
    a first switching device and a second switching device connected in series at a first node;
    a capacitive device connected in parallel to the first switching device and the second power switching device;
    a first diode and a second diode connected in series at a second node; and
    a reactive device connected between the first node and the second node.

12. The apparatus of claim 11, wherein the second node is connected to a mechanical switching device.

13. The apparatus of claim 12, wherein the second diode is connected between the second node and a power source.

14. The apparatus of claim 11, wherein at least one of the first switching device and the second switching device includes an insulated gate bipolar transistor.

15. An apparatus, comprising:
    a switching device and a first diode connected in series at a first node;
    a capacitive device connected in parallel to the switching device and the first diode between a second node and a third node;
    a reactive device connected between the first node and a fourth node; and
    a second diode connected between the fourth node and the third node.

16. The apparatus of claim 15, wherein the fourth node is connected to a mechanical switching device.

17. The apparatus of claim 16, wherein the second diode is connected between the fourth node and a power source.

18. An apparatus, comprising:
    a switching device and a first diode connected in series at a first node, and between a second node and a third node;
    a reactive device connected between the first node and a fourth node;
    a capacitive device connected between a fourth node and the third node; and
    a second diode connected between the fourth node and the second node.

19. The apparatus of claim 18, wherein the fourth node is connected to a mechanical switching device.

20. The apparatus of claim 18, wherein a power source is connected across the second node and the third node.

* * * * *